United States Patent [19]

Eriksen

[11] 4,251,835
[45] Feb. 17, 1981

[54] IMAGE-FORMING SYSTEM FOR OBSCURING POSTER LINES

[75] Inventor: Joern B. Eriksen, Oregon City, Oreg.

[73] Assignee: Tektronix, Inc., Beaverton, Oreg.

[21] Appl. No.: 958,230

[22] Filed: Nov. 6, 1978

Related U.S. Application Data

[63] Continuation-in-part of Ser. No. 854,166, Nov. 23, 1977, abandoned.

[51] Int. Cl.³ .......................... H04N 5/04; H04N 5/76
[52] U.S. Cl. ..................................... 358/244; 358/152
[58] Field of Search ................ 179/100.3 V; 358/127, 358/130, 132, 244, 152, 302, 251; 360/37

[56] References Cited

U.S. PATENT DOCUMENTS

| | | | |
|---|---|---|---|
| 3,571,503 | 3/1971 | McMann | 358/130 |
| 3,811,007 | 5/1974 | Unger | 358/302 |
| 4,096,530 | 6/1978 | Plugge | 358/152 |

Primary Examiner—Bernard Konick
Assistant Examiner—Alan Faber
Attorney, Agent, or Firm—Thomas J. Spence

[57] ABSTRACT

A circuit within an image-forming system for enhancing the gray scale quality of a refreshed raster-scan presentation by causing the raster lines of successive frames of such presentation to be successively interlaced whether such frames are of single- or double-field composition. Also disclosed is a hard-copy device employing such a circuit.

8 Claims, 5 Drawing Figures

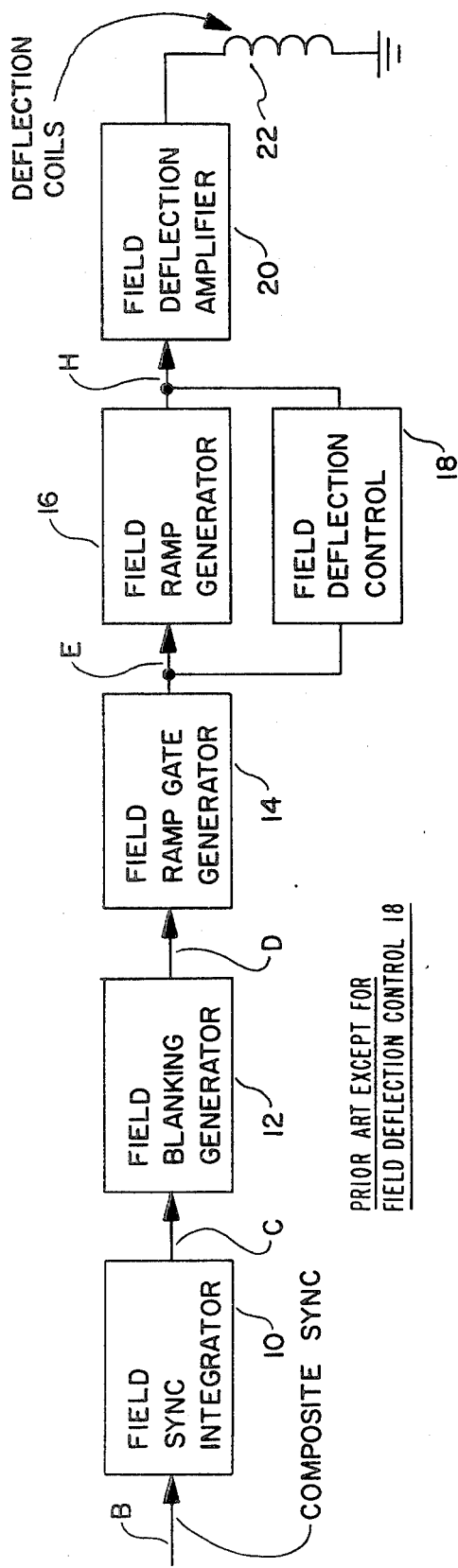
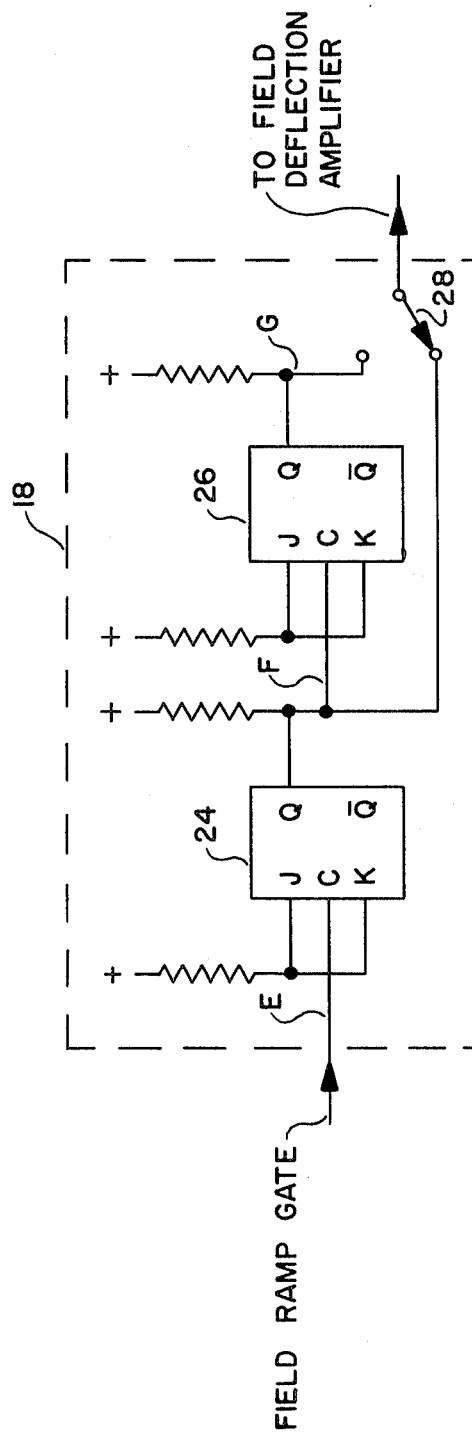
Fig-1
Fig-2

IMAGE-FORMING SYSTEM FOR OBSCURING POSTER LINES

RELATION TO COPENDING APPLICATION

This is a continuation-in-part of application Ser. No. 854,166 filed Nov. 23, 1977, now abandoned.

BACKGROUND OF THE INVENTION

The subject matter of the present invention pertains to means within a raster-scan type display system for producing an image with enhanced gray scale quality.

In a conventional raster-scan display system, for example a television receiver or a computer display terminal, the image formed on the faceplate of the display device is composed of successive presentations of short lived image frames, each of which comprises one or more image fields. Each field or frame is composed, in turn, of a plurality of sequentially occuring, mutually parallel raster lines.

In a television environment, each frame comprises two fields of 262½ raster lines presented at a rate of 60 fields, or 30 frames, per second. The raster lines of the two fields forming each frame are spacially interlaced at display time to produce a composite frame of 525 lines. This interlacing of the raster lines permits an image with acceptable resolution to be produced at a rate sufficient to eliminate perceptable flicker that might otherwise be caused by the successive presentation of the short lived images.

In certain computer-generated-display environments, especially those wherein the display device is employed to produce a hard copy of the image being formed, each frame of the input signal may comprise a single field and be displayed without being interlaced.

In either case, maximum resolution of the image being formed is achieved when the width of the individual raster lines constituting the image is maintained at a minimum. However, as the spaces between the raster lines contain no information, minimizing the raster line width also minimizes ability to produce an image with acceptable gray scale quality. In a television environment, a balance is struck between resolution and gray scale quality by defocusing slightly the electron beam producing the raster lines so as to increase the line width and minimize the effect of the blank spaces between the lines. This approach is generally not acceptable in a computer environment, however, because of the requirement for high resolution.

Accordingly, a need exists for a raster-scan display system capable of forming an image characterized by both high resolution and increased gray scale quality.

SUMMARY OF THE INVENTION

The present invention is directed to means within a raster-scan image producing system for enhancing the gray scale quality of an image being formed. More particularly, the invention comprises a circuit within such a system for causing the successive frames of a refreshed raster-scan image to be interlaced during presentation, whether such frames are of single- or multi-field composition.

The circuit includes a pair of J-K flip-flops connected in the vertical deflection circuit of a display device for selectively shifting the DC level of the vertical deflection ramp signal from a first level to a second different level so as to cause every other frame of an image being formed to be displaced vertically a distance sufficient to interlace its raster lines with those of the immediately preceding frame. Signals are available from the two flip-flops to effect such interlacing whether the information contained in the signal being processed is divided into single- or multiple-field image frames. In other words, the circuit of the present invention will cause alternate single-field frames of N lines to be displaced a distance equal to one-half the distance between adjacent frame lines so as to be interlaced into an image of 2N lines, or alternate two-field interlaced frames of 2N lines to be displaced a distance equal to one-quarter the distance between adjacent frame lines so as to be interlaced again into an image of 4N lines.

The interlacing of single-field frames, or the additional interlacing of two-field frames, produces an image wherein the blank spaces normally occuring between the raster lines are filled with image information without requiring that the electron beam generating the image be defocused or otherwise widened. The result is an image with significantly enhanced gray scale quality and without an attendant degradation of resolution. The advantages of such a scheme are most readily realized in the field of raster-scan copy devices.

It is, therefore, an objective of the present invention to provide a circuit within a raster-scan display system for producing an image with enhanced gray scale quality without causing an attendant degradation of resolution.

It is an additional objective of the present invention to provide a circuit of the type described for producing a refreshed raster-scan presentation, the raster lines of successive frames of which are spacially interlaced.

It is a further objective of the present invention to provide a hard-copy device capable of enhancing the gray scale quality of an image being copied without degrading its resolution quality.

The foregoing objectives, features, and advantages of the present invention will be more readily understood upon consideration of the following detailed description of the invention taken in conjunction with the accompanying drawings.

BRIEF DESCRIPTION OF THE DRAWINGS

FIG. 1 is a block diagram of a field deflection circuit of a raster-scan image-producing system incorporating the image-enhancing circuit of the present invention.

FIG. 2 is a schematic diagram of an exemplary embodiment of the circuit of the present invention.

DESCRIPTION OF THE PREFERRED EMBODIMENT

Figure 3:
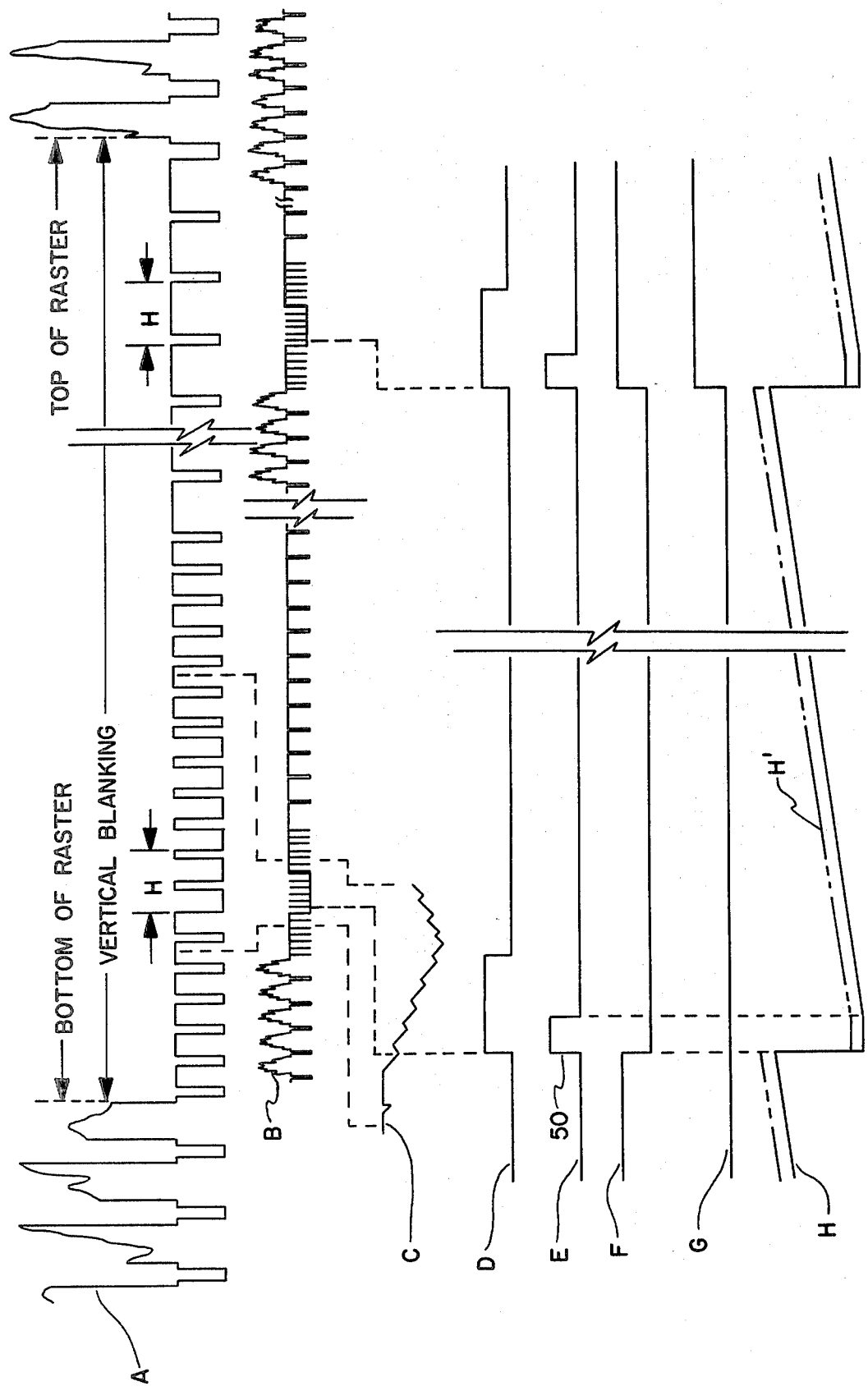
FIG. 3 is a series of waveforms occuring within the field deflection circuit of FIG. 1.

Referring to FIG. 1, there is shown a block diagram of a vertical deflection circuit of a typical raster-scan image-producing device incorporating the circuit of the present invention. As shown, the deflection circuit includes a field sync integrator 10, a field blanking generator 12, a field ramp gate generator 14, a field ramp generator 16, the field deflection control circuit 18 of the present invention, a field deflection amplifier 20, and a vertical deflection coil 22. An exemplary embodiment of the deflection control circuit 18 of the present invention is shown in FIG. 2 as including a first J-K flip-flop 24 connected in series with a second J-K flip-flop 26, and a switch 28 for alternately selecting the output signal produced by either flip flop. The circuit 18 of FIG. 2 is connected operably in parallel with the field ramp generator 16 of the vertical deflection circuit so as to selectively affect, as described more fully below, the DC level of the field ramp signal produced by the field deflection amplifier 20. With the exception of the deflection control circuit 18, the vertical deflection circuit of FIG. 1 is known to the prior art.

The operation of the vertical deflection circuit of FIG. 1, ignoring for the moment the deflection control circuit 18, is conventional and will best be understood with reference to the waveforms of FIG. 3 wherein there is shown a conventional composite video signal A and B, the individual components of which are well known to those persons familiar with the art, and various other signals produced at certain identifiable points within the circuit. With the composite video signal B applied to the input terminal of the field sync integrator 10, an integrated version C of the signal will be produced and transmitted to the field blanking generator 12 where it will cause the production, during vertical retrace time, of a field blanking signal D. The field blanking signal D is transmitted in turn to the field ramp gate generator 14 causing the production in sequence of a field ramp gate signal E and a field ramp signal H (the solid-line version). (Each of the signals B, C, D, E and H are present substantially where indicated in FIG. 1.) The field ramp signal H is then amplified by the field deflection amplifier 20 and transmitted to the vertical deflection coils 22 to control the vertical deflection of the electron beam forming the desired raster-scan image. Omitted from the drawings for clarity but mentioned here for completeness of disclosure are those other known components of a raster-scan image-producing system such as a horizontal deflection circuit, a z-axis control circuit, and a suitable display tube. Such components, their operation, and functions are well known to those persons skilled in the art and need not be described further herein.

The composite video signal B of FIG. 3 is that for a non-interlaced, single-field-per-frame, raster-scan image. (As used herein, the term "frame" is understood to mean a complete image as opposed to a partial image, and the term "field" is understood to mean a component of an image, with the further understanding that a frame may comprise a single field or a plurality of fields.) In response to such a composite video signal, the vertical deflection circuit of FIG. 1, still ignoring the effect of the field deflection control circuit 18, will produce a field ramp signal H as indicated by the solid line of FIG. 3. Such a field ramp signal will produce in a raster-scan image-producing system a non-interlaced image wherein the raster lines of each successive image unit appear at the same locations as those of the immediately preceding and immediately following image units. (As used herein, the term "image unit" is understood to mean a single frame of a single-field-per-frame non-interlaced signal and a single field of a two-field-per-frame interlaced signal.)

Consider now the deflection control circuit 18 configured as shown in FIG. 2 and connected to the deflection circuit as indicated in FIG. 1. As indicated in FIG. 2, the field ramp gate signal E produced by the ramp gate generator 14 is also applied to the clock input terminal C of a first J-K flip-flop 24, the J-K terminals of which are connected to a common source of positive voltage (+) through a common resistor. With the flip-flop 24 thus configured, the output signal F produced at is output terminal Q will change state once for each pulse 50 of the field ramp gate signal E. Since there is one pulse 50 generated for each image unit, or frame, of information contained in the non-interlaced input composite video signal B, the output signal F of flip-flop 24 will change state once per frame, being low for a first frame and high for an immediately following frame. With the movable terminal of switch 28 positioned as shown in FIG. 2, the output signal F from the flip-flop 24 will be transmitted to the input terminal of the field deflection amplifier 20 and combined in a conventional manner with the field ramp signal H so as to impress a DC bias on the field ramp signal H offset the instantaneous value of the signal H a predetermined amount, for example from the solid line path H of FIG. 3 to the dashed line path H' or visa versa, for every other frame of the image being formed. This alternate offsetting of the DC level of the field ramp signal H causes the N equally spaced raster lines of every other frame of the image to be displaced spacially a distance, for example, one-half the distance between adjacent raster lines of a single frame, sufficient to interlace with those of the immediately preceding and succeeding frames, thereby producing a resultant image of 2N equally spaced lines.

As also shown in FIG. 2, the signal F present at the output terminal Q of the first flip-flop 24 is transmitted as well to the clock input terminal C of the second J-K flip-flop 26 causing the flip-flop 26, configured as shown in the figure, to produce at its output terminal Q the signal G shown in FIG. 3. This latter signal G has a period twice that of the signal F and four times that of the field ramp gate signal E. When the movable terminal of the switch 28 is placed in its alternate position, the signal G, rather than the signal F, will be transmitted to the field deflection amplifier 24 for combination with the field ramp signal H, thereby causing the impression of a second DC bias on the field ramp signal H and the resultant offsetting of the instantaneous value of the signal H a second predetermined amount, for example, from the solid line path H of FIG. 3 to the second dashed line path "H" or vice versa, every two cycles, rather than every other cycle. With the DC level of the field ramp signal H alternately offset in this manner, every two image units of the input signal B will be displaced, rather than every other image unit. Thus, a composite video signal B containing information defining an interlaced raster scan image; that is, one wherein each frame comprises two separate fields, the N raster lines of each of which are a subset of the 2N raster lines of the frame and are automatically interlaced according to information contained within the input signal, will have its image units interlaced a second time by the offsetting level of the field ramp signal H to produce an image of 4N lines. In other words, two cycles of the field ramp signal H will follow the path of the solid line H of FIG. 3, during which time the two fields forming a single frame of the input signal will be processed in a conventional manner to produce a partial image of 2N equally spaced lines, and the immediately following two cycles of the field ramp signal will follow the path of the dashed line H' of FIG. 3 during which time the next two fields of the input signal will be processed with their interlaced raster lines displaced spatially a distance, for example, one-quarter the distance between adjacent raster lines of a single field, sufficient to be interlaced a second time with the raster lines of the immediately proceeding two fields to produce the total image of 4N equally spaced lines. The circuit 18 as disclosed is therefore capable of effecting the interlacing of both single- and double-field frames of a refreshed raster-scan image.

The particular environment in which the advantages of the interlacing circuit of the present invention are most readily realized is that of copier devices for producing a hard copy of a refreshed raster-scan presentation. One such device is dislosed in Unger et al. U.S. Pat. No. 3,811,007, assigned to the assignee of the instant application and incorporated herein by this reference. In such a system, an aligned plurality of raster-line segments, for example those indicated in FIG. 4 as occurring on a raster-scan monitor 30 between lines 60 and 62, are displayed as shown in FIG. 5 on the elongate faceplate of a fiber optic cathode ray tube 34, with the solid raster-line segments 54 of FIG. 4 corresponding to the solid raster-line segments 56 of FIG. 5. During operation, the conceptual window 32 of FIG. 4 formed by the lines 60 and 62 scans the monitor image, held fixed during the copy process, in the direction of the arrow 36 so as to cause the image appearing on the fiber optic tube 34 to move across that tube in the direction of the arrow 40 at the same time a sensitized medium 38 is caused to move by the faceplate of the tube 32 in the same direction and at the same rate of speed. As the sensitized medium 38 passes by the tube 34, it is repeatedly exposed to the image presented thereat, thereby causing a copy of the image to be formed within the medium 38, such image being made visible by subsequent conventional development. Because the medium 38 is moving at a much slower speed than the field rate of the image appearing on the faceplate of the fiber optic tube 34, a large number of aligned raster-line segment images will be displayed by the tube 34 for each increment of medium movement and the total exposure of the moving medium 38 will be the cumulative result of the exposure to each individual image.

Figure 4:
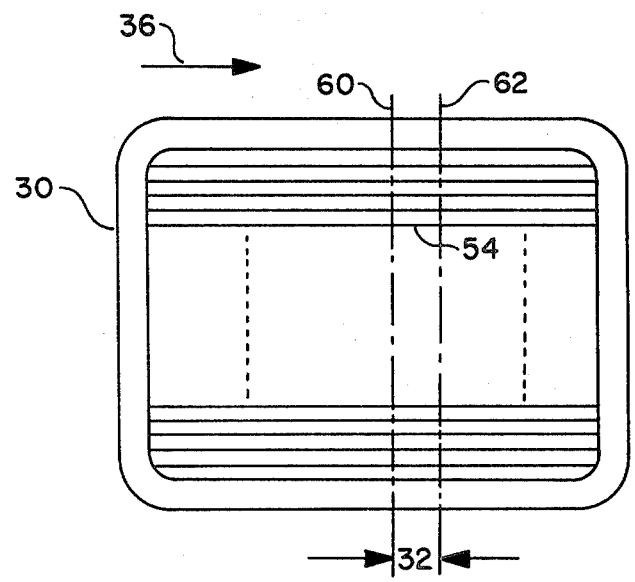
FIG. 4 is a sketch indicating a conceptual relationship in a hard-copy device between information present on a raster monitor and similar information present on the window of a fiber optic cathode ray tube.
Figure 5:
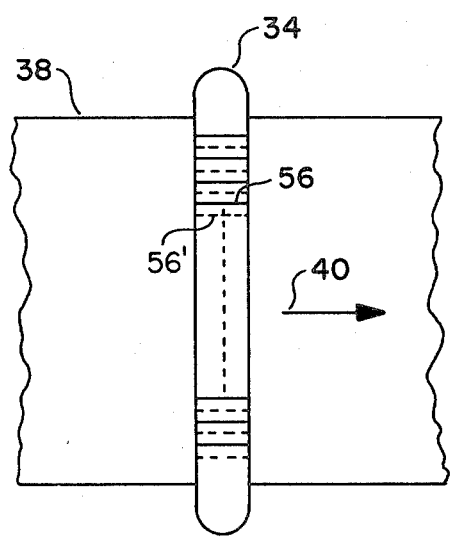
FIG. 5 is a sketch indicating the relationship in a hard copy device between a window of a fiber optic cathode ray tube and a moving web of sensitized material.

Ordinarily, the aligned raster-line segments appearing on the faceplate of the tube 34 correspond in number and proportional spacing to those appearing between the lines 60 and 62 of FIG. 4; that is, an N-line image on the tube 34 will correspond to an N-line image on the monitor 30. It is possible, however, to significantly enhance the gray scale quality of the image being transferred to the sensitized medium if the number of raster-line segments appearing on the faceplate of the tube 34 is doubled and the interline spacing is halved. It is for this purpose that the circuit of the present invention is particularly useful.

With the field deflection control circuit 18 of the present invention connected as shown in FIG. 1 to the vertical deflection circuit forming a part of the copy device suggested by FIG. 5, aligned raster-line segments of alternate frames of the image appearing on the monitor 30 of FIG. 4 will be interlaced as indicated by the solid and dashed lines appearing on the faceplate of the fiber optic tube 34 in FIG. 5, with the solid lines 56 corresponding as indicated earlier to the raster-line segments 54 shown in FIG. 4 and the dashed lines 56' corresponding to the raster-line segments of an immediately following frame of the same image displaced spatially so as to interlace the raster-line segments of the first frame. Since the image appearing on the monitor 30 is held fixed during the copying operation, the interlacing of successive groups of line segments on the faceplate of the fiber optic tube 34 is accomplished without distortion of the image being transferred to the moving sensitized medium 38. This interlacing of the image being copied as it is transferred from the image of FIG. 4 to the moving medium of FIG. 5, fills the spaces between the high resolution raster lines of the original image with high resolution data, thereby enhancing significantly the gray scale quality of the resultant hard copy without at the same time degrading the image resolution.

As will be apparent to those persons skilled in the art, a two-field-per-frame image of 2N lines will be processed in a similar manner, with the switch 28 of the circuit 18 repositioned as indicated earlier, to produce a copier image of 4N lines.

It is to be understood that the circuit 18 of the present invention and the method of its operation are applicable as well to raster-scan type copy devices other than that disclosed by Unger. For example, the reproducing tube need not be of fiber optic construction or elongate in configuration, and the medium need not move during the copying process.

The terms and expressions which have been implied in the foregoing specifications are used therein as terms of description and not of limitation, and there is no intention, in the use of such terms and expressions, of excluding equivalents of the features shown and described or portions thereof, it being recognized that the scope of the invention is defined and limited only by the claims which follow.

I claim as my invention:

1. An image-forming system comprising:
  (a) means for receiving a composite video signal;
  (b) means responsive to said composite video signal for producing a refreshed raster-scan image composed of successive frames of information, each said frame being composed of a plurality of sequentially occurring, mutually parallel raster lines defining a complete image;
  (c) first means within said image-producing means for producing a ramp signal for controlling the generation of said image in one direction, at least one said ramp signal being produced for each said frame of said image; and
  (d) second means within said image-producing means for selectively impressing a DC bias on at least one of said ramp signals so as to offset the instantaneous value of said ramp signal from a first level to a second different level and thereby cause the raster lines of a said frame of said information associated with an offset ramp signal to be successively interlaced with the raster lines of an immediately preceding frame associated with an unoffset ramp signal.

2. The image-forming system of claim 1 wherein each said frame of information comprises two fields of information, each of said fields comprising a subset of said raster lines defining said frame, and wherein said means (c) includes means for producing a separate ramp signal for each field in said frame, the ramp signals being mutually offset by an amount sufficient to cause the raster lines of one of said fields to be interlaced with the raster lines of the other of said fields, and further wherein said means (d) includes means for selectively impressing a common DC bias on both of said ramp signals associated with a single said frame so as to cause the raster lines of the two fields defining said frame to be successively interlaced with the raster lines of the two fields defining an immediately preceding frame.

3. The image-forming system of claim 2 wherein the common DC bias impressed on said ramp signals is sufficient to cause the two fields of the frame of said image associated with said signals to be spatially displaced in said one direction a distance equal to one-quarter the distance between a raster line of the first field of said frame and an corresponding raster line of the second field of said frame.

4. The image-forming system of claim 1 wherein the DC bias impressed on said ramp signal is sufficient to cause the frame of said image associated with said signal to be spatially displaced in said one direction a distance equal to one-half the distance between adjacent raster lines of said frame.

5. The image-forming system of claim 1 wherein said means (d) comprises flip-flop means selectively activatable so as to cause said DC bias to be impressed on said ramp signal.

6. The image-forming system of claim 1 wherein said flip-flop means include a first flip-flop for causing said DC bias to be impressed on every other said ramp signal for a single field per frame video signal and a second flip-flop for causing said DC bias to be impressed on every other pair of said ramp signals for a two field per frame video signal.

7. In an improved image-forming system of the type including means for generating a refreshed raster-scan image and means for exposing a sensitized medium to successive frames of said image so as to record on said medium a copy of said image, the improvement comprising means within said image-generating means for producing a ramp signal for controlling the generation of said image in one direction, at least one of said ramp signals being produced for each said frame of said image, and means for selectively impressing a DC bias on at least one of said ramp signals so as to offset the instantaneous value of said ramp signal from a first level to a second different level and thereby cause the raster lines of said frame of said image to be successively interlaced with the raster lines of an immediately preceding frame.

8. In the improved image-forming system of claim 7 wherein each said frame of said image is composed of two interlaced fields, the raster lines of each said field being a subset of the raster lines of said frame, and wherein said system includes means for producing a separate ramp signal for each field in said frame, with the two ramp signals being mutually offset by an amount sufficient to cause the raster lines of one of said fields to be interlaced with the raster lines of the other of said fields, the further improvement comprising means within said image-generating means for selectively impressing a common DC bias on both of said ramp signals associated with a single said frame so as to cause the raster lines of each said two fields to be successively interlaced with the raster lines of the immediately preceding two fields.

* * * * *

UNITED STATES PATENT AND TRADEMARK OFFICE
CERTIFICATE OF CORRECTION

PATENT NO. : 4,251,835
DATED : Feb. 17, 1981
INVENTOR(S) : Joern B. Eriksen

It is certified that error appears in the above-identified patent and that said Letters Patent are hereby corrected as shown below:

In the title, change "POSTER" to --RASTER--.

Col. 4, line 47, change "path "H" or" to --path H" or--.

Col. 4, line 67, change "line H' of" to --line H" of--.

Signed and Sealed this

Twenty-fifth Day of August 1981

[SEAL]

Attest:

GERALD J. MOSSINGHOFF

Attesting Officer

Commissioner of Patents and Trademarks